United States Patent [19]

Niedecker

[11] Patent Number: 4,573,241

[45] Date of Patent: Mar. 4, 1986

[54] HANGER LOOP ASSEMBLY

[76] Inventor: Herbert Niedecker, Am Ellerhang 8, 6240 Königstein, Fed. Rep. of Germany

[21] Appl. No.: 677,719

[22] Filed: Dec. 4, 1984

[30] Foreign Application Priority Data

Dec. 6, 1983 [DE] Fed. Rep. of Germany ....... 3343968

[51] Int. Cl.⁴ ............................................. A22C 11/00
[52]* U.S. Cl. .................................... 17/44.2; 206/343; 206/479
[58] Field of Search ................ 17/44, 44.2, 44.3, 44.4; 206/343–346, 479

[56] References Cited

U.S. PATENT DOCUMENTS 3,951,262  4/1976  Niedecker ..................... 17/44.2 X

FOREIGN PATENT DOCUMENTS 2724393  11/1978  Fed. Rep. of Germany ....... 17/44.4

Primary Examiner—Willie G. Abercrombie
Attorney, Agent, or Firm—Sprung, Horn, Kramer & Wood

[57] ABSTRACT

Plural sausage hanger loops are connected onto a hanger strap by the thread from which the loops are formed, this connection being at a junction where the thread overlaps itself, the overlapping thread portions also being joined together at this junction.

3 Claims, 5 Drawing Figures

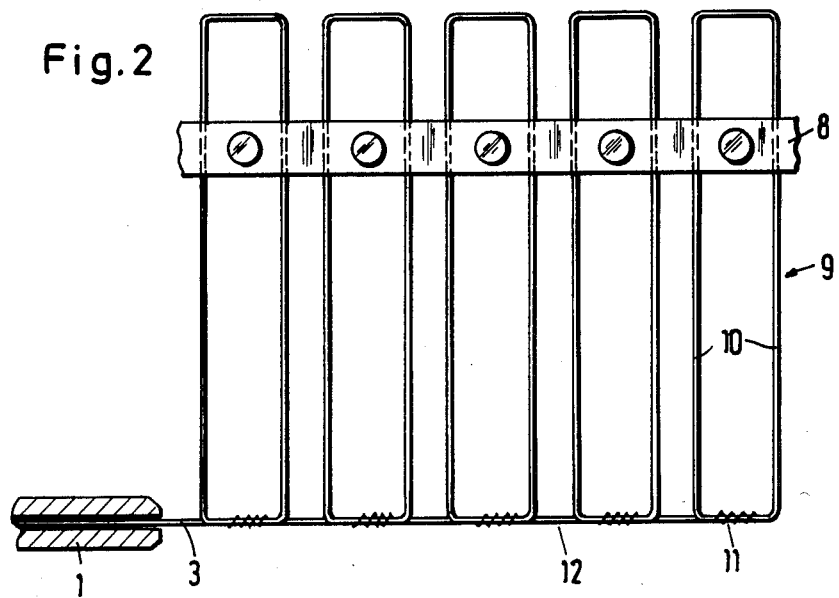
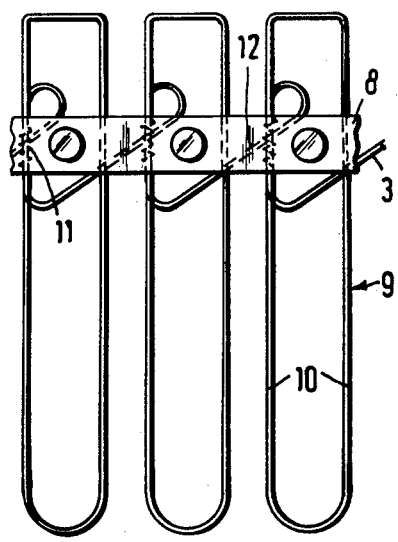 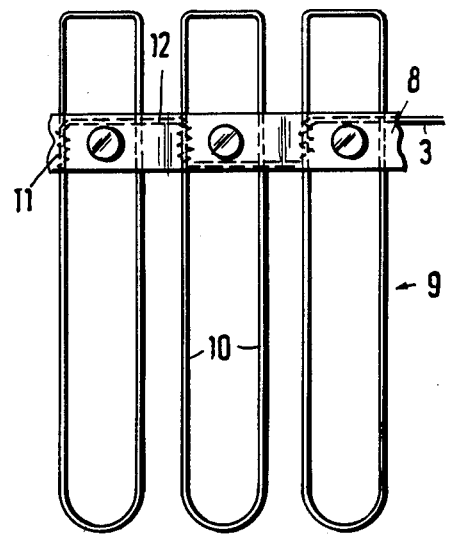

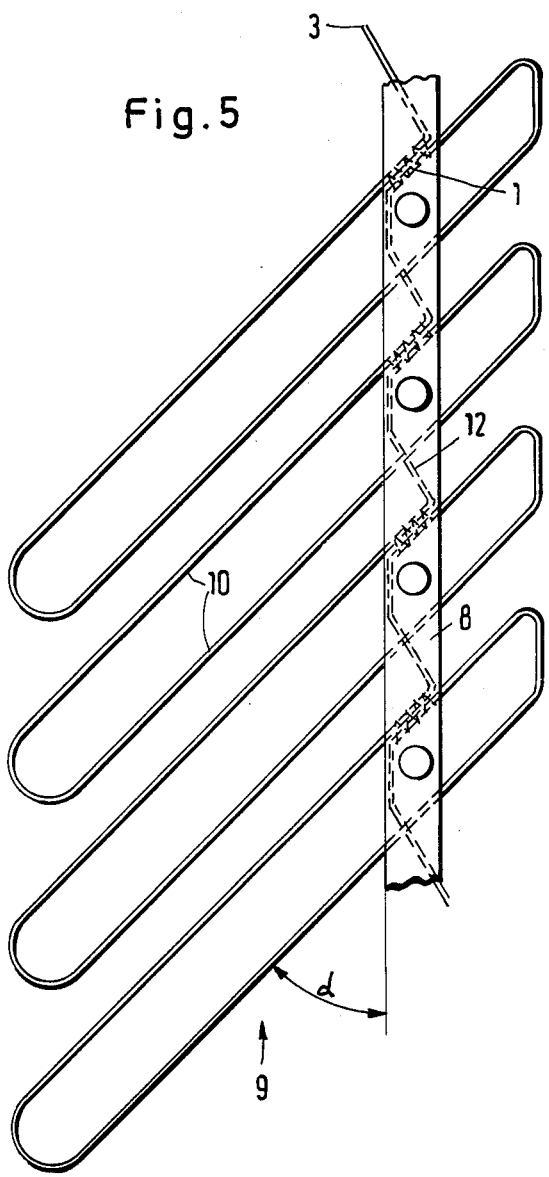

HANGER LOOP ASSEMBLY

This invention relates to an assembly of closed hanger loops provided on a carrying strap and adapted to be mechanically fed to machines for closing tubular films and bags, particularly sausages.

Such hanger loops have previously been secured with their approximately parallel sides to a carrying strip at spaced apart locations in such a manner that open loop portions protrude from both sides of the carrying strap (German Patent Specification No. 23 52 000). In that case each loop is individually made with a knot and applied to the carrying strap. This may result in the disadvantage that the individual loop may easily be twisted in that portion of the loop which is provided with the knot so that the application of the loop to the smoking bar is rendered more difficult. When the loop-carrying strap is withdrawn from a magazine roll, the knots may be interlaced so that disturbances may occur. Besides, the knot may be disturbing as the loop secured to the casing section moves through the casing brake. It is an object of the invention to avoid said disadvantages.

That object is accomplished in accordance with the invention in that in an assembly of the kind described first hereinbefore the loops are connected on the carrying strap by the thread from which the loops have been formed and said thread is a continuous thread, from which the loops have been made in that the thread overlaps itself in a portion thereof and the overlapping thread portions are joined to each other at least in part.

In the making of the loop the overlapping thread portions may be joined by adhesive bonding, sewing or welding or by a machine-made joint, e.g., by means of a closing clip.

The joint between the overlapping thread portions may be disposed at any desired portion of the loop. The overlapping thread portions are suitably disposed at the end of the loop or adjacent to the carrying strap. If the overlapping thread portions are disposed at the end, the thread portion which connects the loops may be severed before the strap is coiled to form a magazine roll. To single the loops, the carrying strap is severed before the loops are received by the closing clip in the closing machine.

If the thread portions connecting the loops are disposed adjacent to the carrying strap, said thread portions will be severed at the time at which the carrying strap is cut through before the loops are received by the closing clip in the closing machine.

The loop assembly in accordance with the invention affords the advantage that the knot in each loop is eliminated so that the disadvantages involved in said knot will be avoided. Besides, it is no longer necessary first to make individual loops having a knot so that the magazine strap which carries the loops can be made more economically. Moreover, the elimination of the knot means a saving of 30 to 50% of the thread material, which is rather expensive. The loops for the assembly in accordance with the invention can be made in a simple manner in that the continuous thread is laid around pins so as to form the loops.

The carrying strip may consist only of an adhesive tape provided with a continuous or interrupted adhesive surface or may consist of such adhesive tape and an additional, stiffer covering tape; in the latter case the loops are provided between the two tapes.

A method of making and arranging the hanger loops in accordance with the invention will be described with reference to the drawings.

FIG. 2 shows an arrangement of loops having overlapping thread portions disposed at an end of each loop.

FIGS. 3 and 4 show loop assemblies in which the overlapping thread portions are disposed adjacent to the carrying strap.

FIG. 5 shows an assembly comprising loops provided on the carrying strap and extending at any desired, selected angle relative to the carrying strap.

Figure 1:
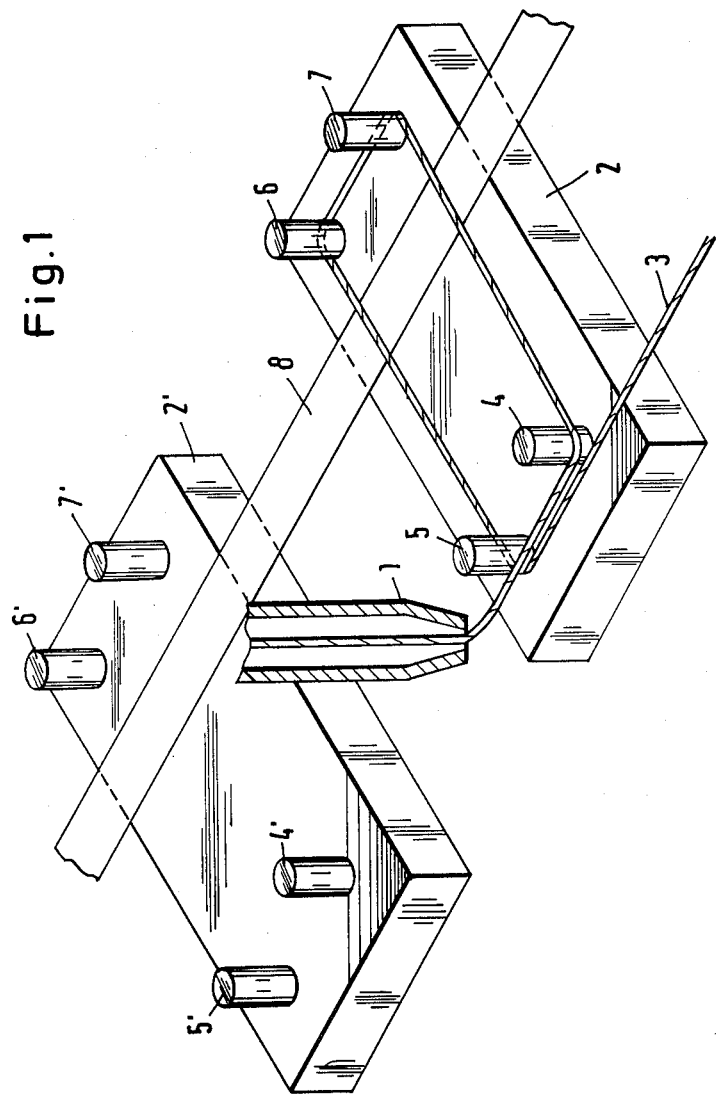
FIG. 1 illustrates a method of making the assembly in accordance with the invention including hanger loops on a carrying strap.

FIG. 1 shows two forming plates 2, 2', which constitute a portion of a continuously revolving chain consisting of or comprising such forming plates. The loop assembly in accordance with the invention is made by a predetermined sequence of motions of the thread guide 1 and/or the forming plate 2. As a result, the continuous thread 3 is laid around the pins 4, 5, 6, 7 and then again around the pin 4 and to the pin 5. For the making of the next following loop, the next following forming plate 2' is in the position previously assumed by the next preceding forming plate 2 so that the thread guide 1 is in its initial position behind the pin 5' and the new cycle of motion can now begin. The carrying strap 8 extends between the forming plates 2, 2' and the thread 3 and in a position which is not shown is joined to the overlying threads. The carrying strap 8 is perforated at the same time.

In another station, not shown, the overlapping thread portions between pins 4 and 5 are joined. Thereafter the carrying strap 8 to which the loops have been attached is wound up to form a magazine roll.

A portion of a loop-carrying strap 9 made with the apparatus shown in FIG. 1 is shown in FIG. 2 in a position before the coiling station, not shown. The continuous thread 3 is provided on the carrying strap 8 and forms the loops 10. By the joint 11, the thread portions are joined to form the loop 10. The thread portion 12 which connects the loops 10 has not yet been severed and may be cut through before the coiling station or before the loops are received by the closing clip in the closing machine.

FIGS. 3 and 4 show respective loop-carrying straps 9. The loops 10 have also been made with an apparatus as shown in FIG. 1 but with the pins in a different arrangement corresponding to the desired configuration of the thread. The joint 11 and the thread portion 12 connecting the loops 10 are now disposed adjacent to the carrying strap 8. Together with the carrying strap 8, the thread portion 12 is cut through before the loops are received by the closing clip in the closing machine.

In the loop-carrying strap 9 shown in FIG. 5, the loops 10 extend at an acute angle $\alpha$ to the carrying strap. The angle $\alpha$ may be between 90° and 0°.

I claim:

1. An assembly of closed hanger loops provided on a carrying strap and adapted to be mechanically fed to machines for closing tubular films and bags, particularly sausages, characterized in that the loops (10) are connected on the carrying strap (8) by the thread (3) from which the loops have been formed and said thread (3) is a continuous thread, from which the loops (10) have been made in that the thread (3) overlaps itself in a portion (11) thereof and the overlapping thread portions (11) are joined to each other at least in part.

2. An assembly according to claim 1, characterized in that the loops (10) are separated on the carrying strap (8) in the thread portions (12) connecting the loops.

3. An assembly according to claim 1, characterized in that the thread portions (12) which connect the loops (10) are disposed adjacent to the carrying strap (8) and connect the loops until they are singled in the closing machine.

* * * * *